(12) United States Patent
Yong et al.

(10) Patent No.: US 12,371,102 B2
(45) Date of Patent: Jul. 29, 2025

(54) END MODULE FOR VEHICLE AND LOWER BODY INCLUDING SAME FOR VEHICLE

(71) Applicants: Hyundai Motor Company, Seoul (KR); Kia Corporation, Seoul (KR)

(72) Inventors: Ji Ae Yong, Hwaseong-si (KR); Seok Ju Gim, Seongnam-si (KR); Tae Gyu Park, Hwaseong-si (KR); Ho Yeon Kim, Daegu (KR); Sun Hyung Cho, Suwon-si (KR); Chul Hee Heo, Hwaseong-si (KR); Won Oh Kim, Ansan-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 405 days.

(21) Appl. No.: 18/052,972

(22) Filed: Nov. 7, 2022

(65) Prior Publication Data
US 2023/0278631 A1    Sep. 7, 2023

(30) Foreign Application Priority Data
Mar. 7, 2022  (KR) .......................... 10-2022-0028820

(51) Int. Cl.
*B62D 23/00* (2006.01)
*B62D 21/02* (2006.01)
(Continued)

(52) U.S. Cl.
CPC ........... *B62D 23/005* (2013.01); *B62D 21/02* (2013.01); *B62D 27/023* (2013.01); *B62D 27/06* (2013.01); *B62D 21/152* (2013.01)

(58) Field of Classification Search
CPC ...... B62D 21/02; B62D 21/152; B62D 21/08; B62D 21/12; B62D 2201/15;
(Continued)

(56) References Cited

U.S. PATENT DOCUMENTS

| 4,735,355 A | * | 4/1988 | Browning | B62D 21/08 228/175 |
| 8,684,451 B1 | * | 4/2014 | Park | B62D 25/08 296/203.02 |

(Continued)

FOREIGN PATENT DOCUMENTS

| KR | 20210070808 A | 6/2021 |
| KR | 20230083001 A | 6/2023 |

*Primary Examiner* — Dennis H Pedder
(74) *Attorney, Agent, or Firm* — Slater Matsil, LLP

(57) ABSTRACT

An embodiment end module of a vehicle includes longitudinal members spaced apart in a width direction, each having a pipe shape extending in a front-rear direction of the vehicle, and each being located at end portions of a lower body of the vehicle, a support module located in a front or rear end portion of the lower body, the support module including a plurality of pipes including transverse members extending in the width direction and spaced apart in a vertical direction and a first connection member extending in the vertical direction to connect transverse members, and the support module being spaced apart from end portions of the longitudinal members in the front-rear direction of the vehicle and connected to the first connection members and the longitudinal members, and a back beam including a pipe extending in a transverse direction and connected to the end portions of the longitudinal members.

20 Claims, 10 Drawing Sheets

(51) Int. Cl.
 *B62D 25/08* (2006.01)
 *B62D 27/02* (2006.01)
 *B62D 27/06* (2006.01)
 *B62D 21/15* (2006.01)

(58) Field of Classification Search
 CPC .... B62D 2201/17–023; B62D 2201/06; B62D 23/005; B62D 25/00; B62D 33/00; B62D 33/04
 USPC .......... 296/203.1–4, 193.4, 8, 9, 205, 29, 30
 See application file for complete search history.

(56) References Cited

U.S. PATENT DOCUMENTS

| | | | |
|---|---|---|---|
| 11,279,412 B2* | 3/2022 | Kim | B62D 25/14 |
| 2001/0000119 A1* | 4/2001 | Jaekel | B62D 23/005 |
| | | | 296/205 |
| 2022/0219757 A1* | 7/2022 | Heo | B62D 27/065 |
| 2023/0174161 A1 | 6/2023 | Kim et al. | |

* cited by examiner

END MODULE FOR VEHICLE AND LOWER BODY INCLUDING SAME FOR VEHICLE

CROSS-REFERENCE TO RELATED APPLICATIONS

This application claims the benefit of Korean Patent Application No. 10-2022-0028820, filed on Mar. 7, 2022, which application is hereby incorporated herein by reference.

TECHNICAL FIELD

The present disclosure relates to a technology for a vehicle body structure of a vehicle.

BACKGROUND

In a general vehicle body structure, a vehicle body is produced by processing and welding parts through press machining using a mold, and thus the vehicle body has a disadvantage in that large-scale facility investment such as a press factory, a car body welding plant, and a painting plant is required and a degree of design freedom is low.

In particular, the existing vehicle body requires a lot of design changes when producing a small number of different types of vehicle bodies, and thus there is a problem in that the number of molds is also drastically increased and the production cost is inevitably increased.

Recently, in order to respond in a timely manner to the rapidly changing market environment and customer needs, it is necessary to simplify vehicle production and minimize the development period.

Accordingly, there is a demand for a vehicle body structure capable of responding to various designs and with an improved assemblability of a vehicle body in a smart factory environment.

In addition, with the recent development of autonomous driving technology, a vehicle capable of transporting cargo without a driver in the vehicle is required. When an autonomous vehicle in which the driver does not ride is manufactured, some parts are modularized for cost reduction and manufacturing simplification, and there is a demand for a vehicle that can be manufactured in an eco-friendly smart factory where modularized vehicle parts are assembled only by mechanical assembly such as bolting without a pressing process, a body welding process, and a painting process.

The foregoing is intended merely to aid in the understanding of the background of embodiments of the present disclosure, and is not intended to mean that the present disclosure falls within the purview of the related art that is already known to those skilled in the art.

SUMMARY

The present disclosure relates to a technology for a vehicle body structure of a vehicle. Particular embodiments relate to a technology for a vehicle body structure of a vehicle which is operating for the purpose of cargo delivery, a mobile market, and the like. Some embodiments of the present disclosure relates to a technology for a vehicle body frame structure for simplifying the manufacture of a vehicle.

Accordingly, embodiments of the present disclosure address problems occurring in the related art, and embodiments of the present disclosure provide for manufacturing of a lower body of a vehicle through a plurality of pipes and providing a vehicle which is assembled simply by bolting coupling.

The technical problems solvable by embodiments of the present disclosure are not limited to the above-mentioned technical problems and other technical problems which are not mentioned can be clearly understood by those skilled in the art to which the present disclosure pertains from the following description.

According to one embodiment, there is provided an end module for a vehicle, which is located in a front end portion or a rear end portion of a lower body of the vehicle in which an upper body is assembled in an upper portion, the end module including a pair of longitudinal members which are spaced apart in a width direction, have a pipe shape extending in the front-rear direction, and are located at end portions of the lower body, a support module which is located in a front end portion or a rear end portion of the lower body, is formed of a plurality of pipes including a pair of transverse members extending in the width direction and spaced apart in a vertical direction and a first connection member extending in the vertical direction to connect the transverse member, and is spaced apart from end portions of the pair of longitudinal members in a front-rear direction of the vehicle and connected to the first connection member and the pair of longitudinal members, and a back beam connected to end portions of the pair of longitudinal members in the form of a pipe extending in a transverse direction.

The end module may further include an end patch coupled to an end portion of the longitudinal member, the transverse member, the back beam, or the first connection member, which is formed in the form of a pipe, to cover a cross section of the longitudinal member, the transverse member, the back beam, or the first connection member and provided to connect the end portion to another pipe by bolting.

The end patch may be spaced inward from the end portion of the longitudinal member, the transverse member, the back beam, or the first connection member and welded and coupled thereto, and a bead generated due to the welding may be located in a gap space formed by the end patch being spaced inward from the longitudinal member, the transverse member, the back beam, or the first connection member.

A pair of transverse members may be formed to be longer than a separation distance between the pair of longitudinal members.

The support module may further include a second connection member in the form of a pipe extending to connect the end portions of the pair of transverse members spaced apart in the vertical direction.

The end module may further include a reinforcing part configured to extend to connect the end portion of the back beam to the second connection member.

The longitudinal member may be connected to an inner side of the first connection member.

The end module of the vehicle may be symmetrically disposed in the front side and the rear side of the vehicle.

The longitudinal member, the support module, and the back beam may be coupled to each other by bolting coupling.

According to another embodiment, there is provided a lower body for a vehicle, which includes an end module of a vehicle and in which an upper body is assembled in an upper portion formed of a plurality of pipes, the lower body including a front lower body and a rear lower body in which the end module of the vehicle is coupled to end portions, which are formed of a plurality of pipes, and on which a wheel and a suspension of the vehicle are mounted, and a pair of lower body main members, each having a pipe shape, configured to connect both sides of upper ends of the front lower body and the rear lower body spaced apart from each other, extend forward and rearward to form side members of upper portions of the front lower body the rear lower body, and form an overall length of the vehicle.

BRIEF DESCRIPTION OF THE DRAWINGS

The above and other objects, features and other advantages of embodiments of the present disclosure will be more clearly understood from the following detailed description when taken in conjunction with the accompanying drawings, in which.

DETAILED DESCRIPTION OF ILLUSTRATIVE EMBODIMENTS

Figure 1:
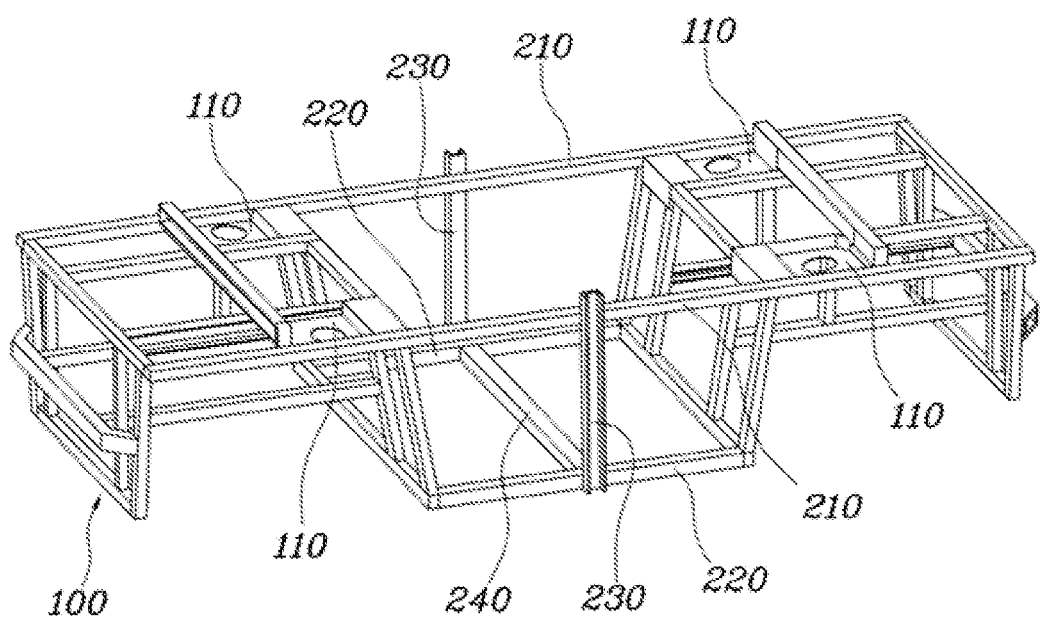
FIG. 1 is a perspective view illustrating a lower body of a vehicle according to one embodiment of the present disclosure.

Specific structural and functional descriptions of the embodiments of the present disclosure disclosed in this disclosure or application are illustrative only for the purpose of describing the embodiments according to the present disclosure, and the embodiments according to the present disclosure may be implemented in various forms and should not be construed as being limited to embodiments described in this disclosure or application.

The embodiments according to the present disclosure may be variously modified and may have various forms, so that specific embodiments will be illustrated in the drawings and will be described in detail in this disclosure or application. It should be understood, however, that it is not intended to limit the embodiments according to the concept of the present disclosure to specific disclosure forms, but it includes all modifications, equivalents, and alternatives falling within the spirit and scope of the present disclosure.

The terms first, second, and/or the like may be used to describe various components, but the components should not be limited by these terms. These terms may be used only for the purpose of distinguishing one component from another component, and, for example, a first component may be referred to as a second element, and similarly, the second component may also be referred to as the first component without departing from the scope of the present disclosure.

When a component is referred to as being "connected," or "coupled" to another component, it may be directly connected or coupled to another component, but it should be understood that yet another component may exist between the component and another component. On the contrary, when a component is referred to as being "directly connected" or "directly coupled" to another, it should be understood that still another component may not be present between the component and another component. Other expressions describing the relationship between components, that is, "between" and "immediately between," or "adjacent to" and "directly adjacent to" should also be construed as described above.

Terms used herein are used only for the purpose of describing specific embodiments, and are not intended to limit the present disclosure. Unless the context clearly dictates otherwise, the singular form includes the plural form. In this disclosure, the terms "comprising," "having," or the like are used to specify that a feature, a number, a step, an operation, a component, an element, or a combination thereof described herein exists, and they do not preclude the presence or addition of one or more other features, numbers, steps, operations, components, elements, or combinations thereof.

Unless defined otherwise, all terms including technical or scientific terms used herein have the same meaning as commonly understood by those of skill in the art to which the present disclosure pertains. General terms that are defined in a dictionary shall be construed to have meanings that are consistent in the context of the relevant art and will not be interpreted as having an idealistic or excessively formalistic meaning unless clearly defined in the present specification.

Hereinafter, exemplary embodiments of the present disclosure will be described in detail with reference to the accompanying drawings. The same reference numerals in each drawing indicate the same members.

In the conventional vehicle, passengers ride, in consideration of ride comfort, safety specifications, appearance, and traveling performance for the passengers, in order to prepare all of a suspension, an exterior, an interior, a steering device, and a safety device of the vehicle in the vehicle, a relatively long manufacturing process and manufacturing cost are required. In addition, since each individual vehicle should be manufactured for each use, there is a problem in that it is not possible to manufacture a custom-made vehicle to fit all uses.

The vehicle to which the technology according to embodiments of the present disclosure is applied relates to a business vehicle having various commercial purposes, such as logistics, food trucks, delivery, and service provision among purpose built vehicles (PBVs). In the case of the illustrated embodiments, as a representative case, only cargo is loaded in an internal space and transported without a passenger on board, and the vehicle may be driven through an autonomous driving system, and thus the vehicle is for an unmanned delivery/logistics/delivery system of cargo or food.

The vehicle according to embodiments of the present disclosure may be simplified in design and manufacturing as a structure is simplified. The vehicle has an advantage in that the cost is reduced and supply and demand of parts are facilitated as the parts of the vehicle are modularized and shared, and the vehicle may be completed only by mechanical coupling such as bolting or riveting through an eco-friendly smart factory production method where modularized vehicle parts do not undergo a press process, a body welding process, and a painting process.

Embodiments of the present disclosure relate to a method of manufacturing a vehicle body through a plurality of pipes so as to simplify the manufacturing process, exclude a welding process as much as possible, and reduce a manufacturing cost of a body member. However, a pipe may be manufactured through extrusion or roll forming, and thus there is an advantage of low cost, but it is necessary for the pipe to reinforce coupling bonding strength when combining the pipe with another pipe or other panels. Therefore, in embodiments of the present disclosure, a coupling member for closing an open end portion of the pipe is applied to allow an end portion of the pipe to be strongly coupled to another pipe or another panel, deformation of the open end portion of the pipe is suppressed through the coupling member, a coupling surface for coupling to other components is provided, and a specific configuration of the coupling member will be described below. According to a structure in which the pipe and the coupling member of embodiments of the present disclosure are integrated, there is an advantage in that a vehicle body may be easily assembled only through mechanical coupling such as bolts or rivets in an eco-friendly smart factory, welding is not required so the vehicle body is eco-friendly, some members of the vehicle body in case of an accident or maintenance are easily replaced, and various types of vehicles may be easily assembled and produced.

The vehicle to which embodiments of the present disclosure are applied may be divided into a business area which is located at an upper portion and in which cargo is loaded, and a drive area which is located at a lower portion and is in charge of driving the vehicle. The business area may be variously changed according to customer needs, and the drive area may be variously changed according to driving conditions of the vehicle.

The vehicle of the illustrated embodiments is basically designed to have a structure in which a door is opened only on one side to open a space for loading cargo, and a business area may be designed in various shapes according to customer needs.

Figure 10:
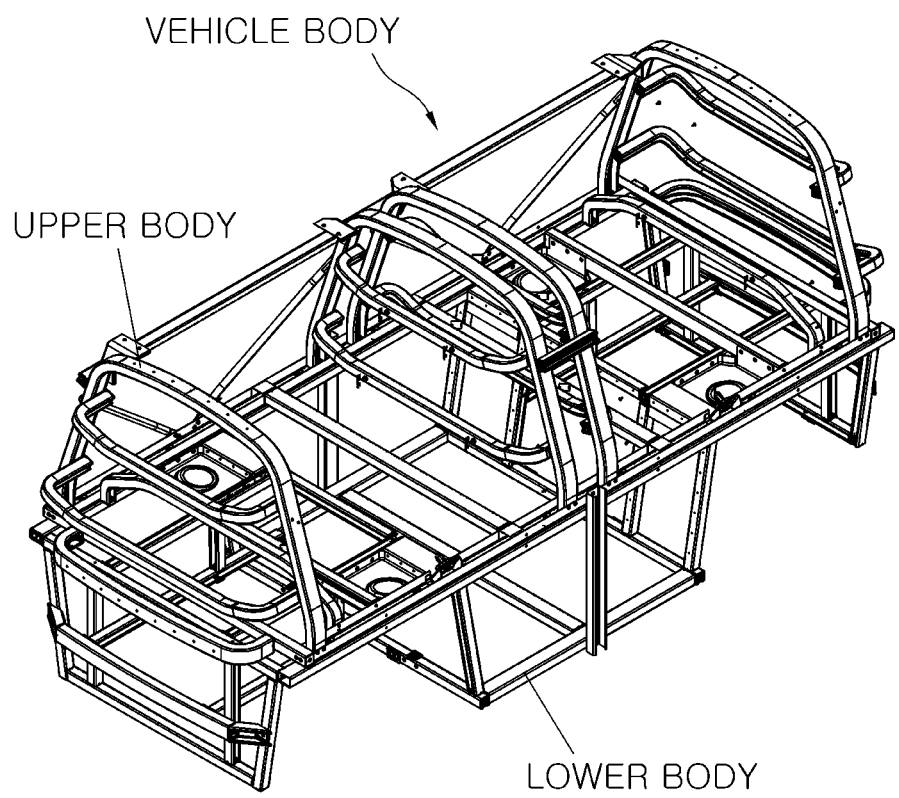
FIG. 10 is a diagram illustrating a vehicle body of a vehicle according to one embodiment of the present disclosure.

FIG. 10 is a diagram illustrating a vehicle body of a vehicle according to one embodiment of the present disclosure.

Referring to FIG. 10, an upper body and a lower body according to embodiments of the present disclosure are assembled by bolting through a plurality of pipe-shaped members so that manufacturing, repair and rebuilding are easy, a lower portion of the upper body may form a floor, and a driving motor, wheels, a suspension, and a battery may be mounted on the lower body in a front-rear direction. In addition, an additional battery may be mounted or a cargo space may be configured in a central portion of the lower body. In addition, the upper body and the lower body are assembled and then vertically fastened to form the vehicle body of the completed vehicle. Therefore, the upper body and lower body may be assembled in various combinations.

In addition, an inner panel is coupled to the upper body and the lower body through simplified mechanical coupling, such as bolting or riveting, or fit-coupling between members. An outer panel, which is coupled to an outer side of the inner panel and serves as an exterior of the vehicle, is provided and may be coupled to the inner panel through simplified mechanical coupling, such as bolting or riveting, or fit-coupling between members.

An end module 120 of the vehicle according to embodiments of the present disclosure forms a vehicle body located in the drive area of the vehicle for the unmanned delivery system.

Figure 2:
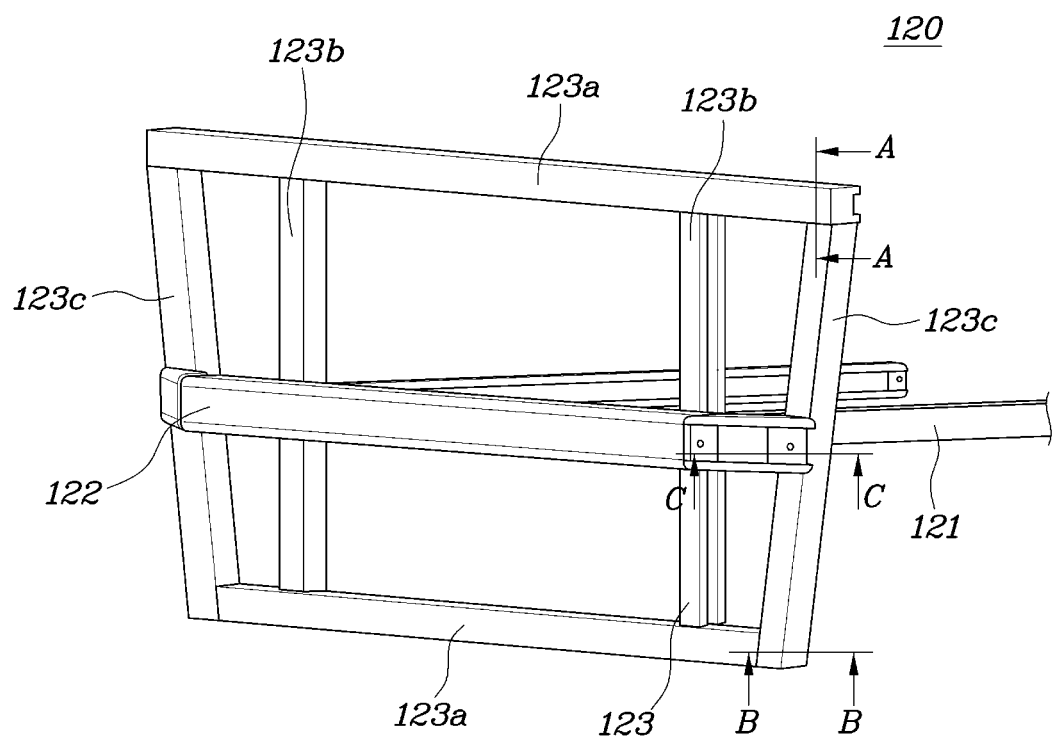
FIG. 2 is a perspective view illustrating an end module of the vehicle according to one embodiment of the present disclosure.
Figure 3:
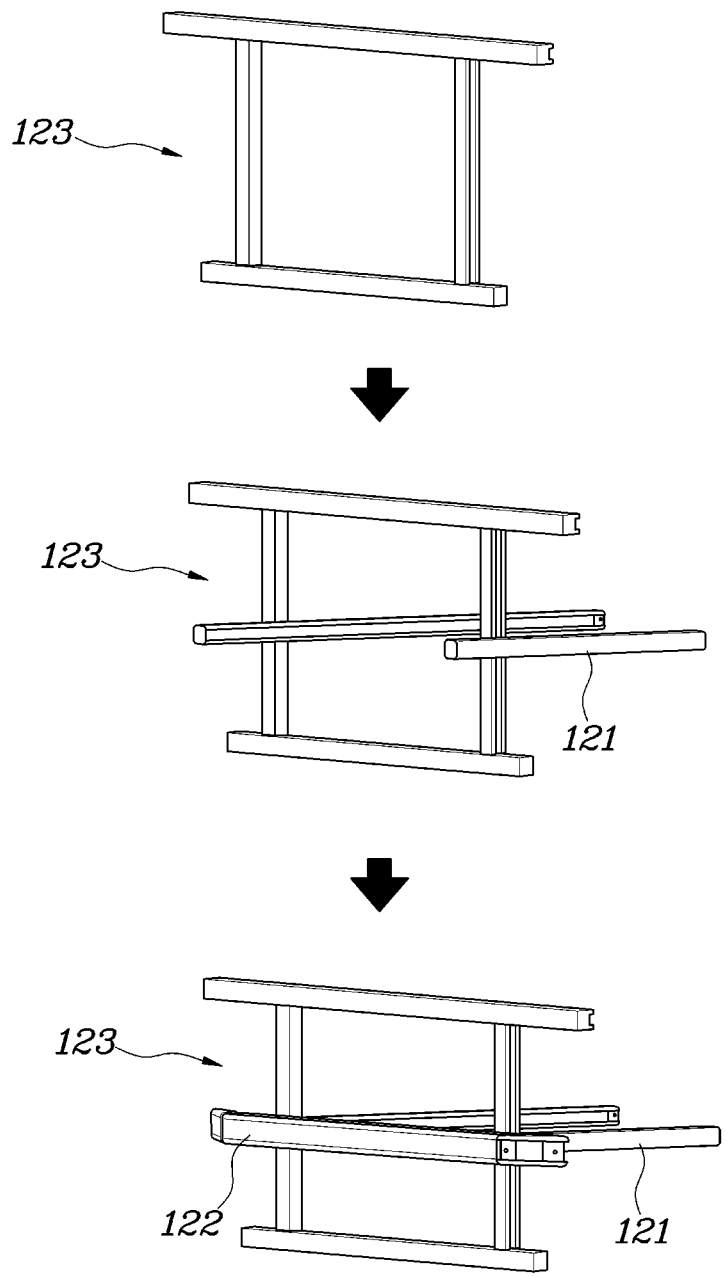
FIG. 3 is a diagram illustrating a manufacturing sequence of miniaturizing the end module of the vehicle according to one embodiment of the present disclosure.
Figure 4:
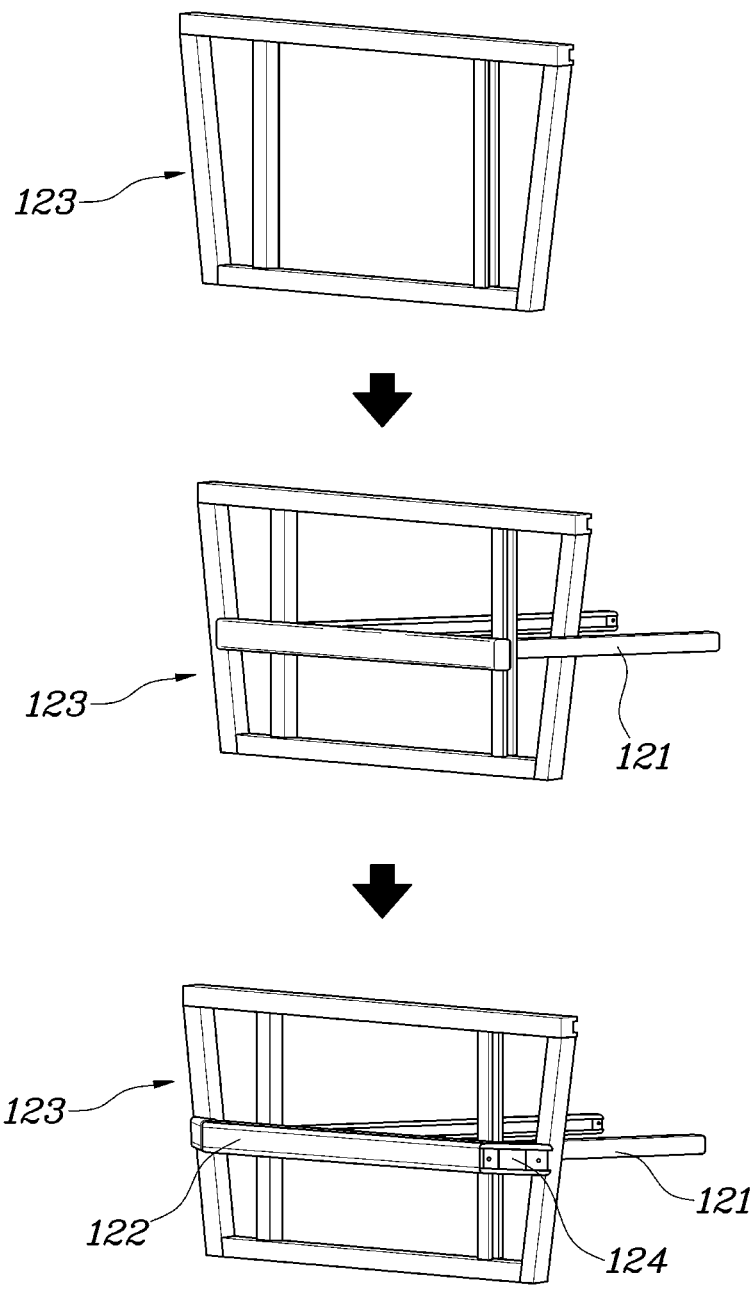
FIG. 4 is a diagram illustrating a manufacturing sequence of strengthening rigidity of an end module of a vehicle according to another embodiment of the present disclosure.
Figure 5:
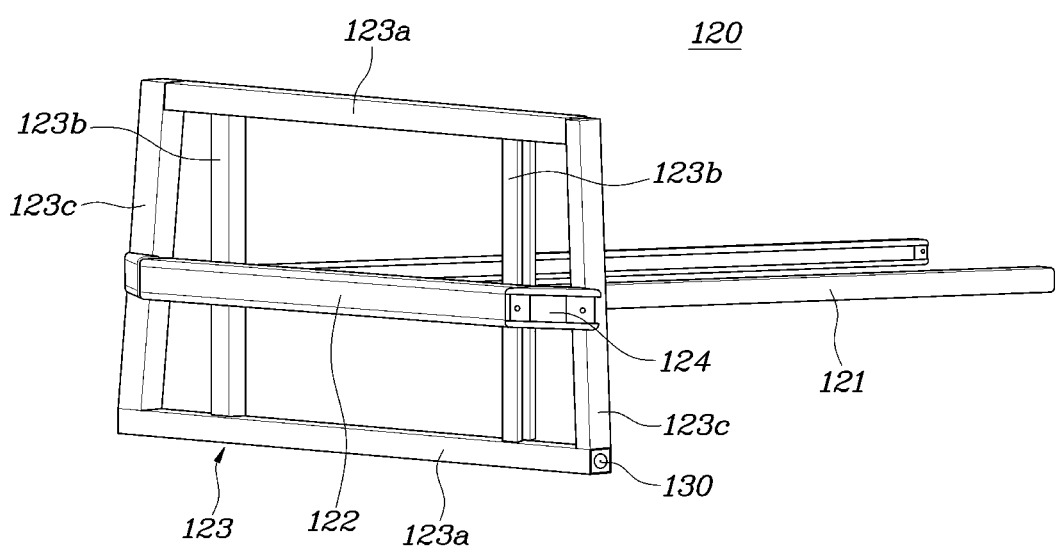
FIG. 5 is a perspective view illustrating an end module of a vehicle according to another embodiment of the present disclosure.

FIG. 1 is a perspective view illustrating a lower body of a vehicle according to one embodiment of the present disclosure, FIG. 2 is a perspective view illustrating the end module 120 of the vehicle according to one embodiment of the present disclosure, FIG. 3 is a diagram illustrating a manufacturing sequence of miniaturizing the end module of the vehicle according to one embodiment of the present disclosure, FIG. 4 is a diagram illustrating a manufacturing sequence of strengthening rigidity of an end module of a vehicle according to another embodiment of the present disclosure, and FIG. 5 is a perspective view illustrating the end module 120 of the vehicle according to another embodiment of the present disclosure.

Exemplary embodiments of the end module 120 of the vehicle according to embodiments of the present disclosure will be described with reference to FIGS. 1 to 5.

As shown in FIGS. 1 and 2, the vehicle to which embodiments of the present disclosure are applied is not for passengers, the vehicle body may be manufactured in a pipe shape to maximize reduction in production cost of the vehicle, and the vehicle bodies of the pipe shape may be coupled to each other to complete the vehicle.

In the present specification, a front-rear direction of the vehicle is described as a longitudinal direction of the vehicle, and a left-right direction of the vehicle is described as a transverse direction of the vehicle.

The end module 120 of the vehicle according to embodiments of the present disclosure is an end module 120 of the vehicle located in a front end portion or a rear end portion of the lower body of the vehicle in which the upper body is assembled on an upper portion of the lower body and includes a pair of longitudinal members 121 which are spaced apart in a width direction, have a pipe shape extending in the front-rear direction, and are located at end portions of the lower body, a support module 123 which is located in the front end portion or the rear end portion of the lower body, is formed of a plurality of pipes including a pair of transverse members 123a extending in the width direction and spaced apart in a vertical direction and first connection members 123b extending in the vertical direction to connect the transverse members 123a, and is spaced apart from end portions of the pair of longitudinal members 121 in the front-rear direction of the vehicle and connected to the first connection members 123b and the pair of longitudinal members 121, and a back beam 122 connected to the end portions of the pair of longitudinal members 121 in the form of a pipe extending in the transverse direction.

As shown in FIGS. 1 to 2, the end module 120 of the vehicle is disposed in a front side and a rear side of the lower body of the vehicle and is manufactured to protect the vehicle when colliding with an obstacle in the front side or the rear side during traveling and protect the obstacle being collided with.

A lower body main member 210, which extends in the front-rear direction of the vehicle and is formed in the form of a shape, may be coupled to both sides of the end module 120, and a pair of the end modules 120 may be coupled to both end portions of the lower body main member 210.

The back beam 122 extends in the transverse direction of the vehicle and is coupled to end portions of the longitudinal member 121 and may be located at the front end portion and the rear end portion of the vehicle.

In this way, when the vehicle undergoes a front collision or a rear collision, the obstacle and the back beam 122 collide first and form a load path through which an impact is transmitted to the longitudinal member 121 so that there is an effect capable of absorbing the impact.

The transverse members 123*a*, which are disposed behind the back beam 122, extend in the transverse direction, and are spaced apart in the vertical direction, and a support module 123, which is formed as a connection member connecting the transverse members 123*a* spaced apart in the vertical direction, may be connected to the longitudinal member 121.

In this way, when the back beam 122 collides with an obstacle and an area of the collided obstacle is large, the obstacle comes into contact with the support module 123 so that there is an effect capable of protecting the vehicle from an impact, and the support module 123 is disposed at the front side and the rear side of the vehicle so that there is an effect capable of entirely supporting the front side and the rear side of the lower body of the vehicle to respond to a collision.

In addition, the longitudinal member 121, the back beam 122, and the support module 123 are each provided and formed to implement the same structure as a front end module of the existing vehicle in the form of a pipe, and all of the longitudinal member 121, the back beam 122, and the support module 123 are formed of a pipe and connected to each other so that there is an effect capable of reducing manufacturing production cost and simplifying a manufacturing process of the vehicle by coupling the pipes to each other.

An end patch 130 may be further included, coupled to the end portion of the longitudinal member 121, the transverse member 123*a*, the back beam 122, or the first connection member 123*b*, which is formed in the form of a pipe, to cover a cross section of the end portion, and provided to connect the end portion to another pipe through bolting coupling.

The end module 120 of the vehicle, in which the plurality of pipes are connected to each other, may be provided with an end patch 130 coupled to an end portion of each pipe to be coupled to each other.

When the pipe is cut, an end portion of the cut pipe is open, and thus a separate bracket is required so as to connect the plurality of pipes to each other.

The end patch 130, in which a bolting hole is formed to be coupled to the end portion of the pipe to be bolted to cover a cut surface of the pipe so as to minimize the number of the bracket, may be coupled to the end portion of the longitudinal member 121, the transverse member 123*a*, the first connection member 123*b*, or the back beam 122.

The end patch 130 is manufactured by being coupled when the pipe, such as the longitudinal member 121, the transverse member 123*a*, the back beam 122, or the first connection member 123*b*, is manufactured and then the manufacturing of the end patch 130 is completed. The end patch 130 may be transferred to the smart factory and be coupled through mechanical coupling such as bolting and riveting in the smart factory. In addition, since the end patch 130 is coupled through bolting and riveting, the end patch 130 is easily separated so that there is an effect capable of simply repairing the vehicle or replacing the end patch 130.

The end patch 130 may be welded and coupled by being spaced inward from the end portion of the longitudinal member 121, the transverse member 123*a*, the back beam 122, or the first connection member 123*b*, and a bead of the end patch 130 generated by welding may be located in a gap space formed to be spaced inward from the longitudinal member 121, the transverse member 123*a*, the back beam 122, or the first connection member 123*b*.

Figure 6:
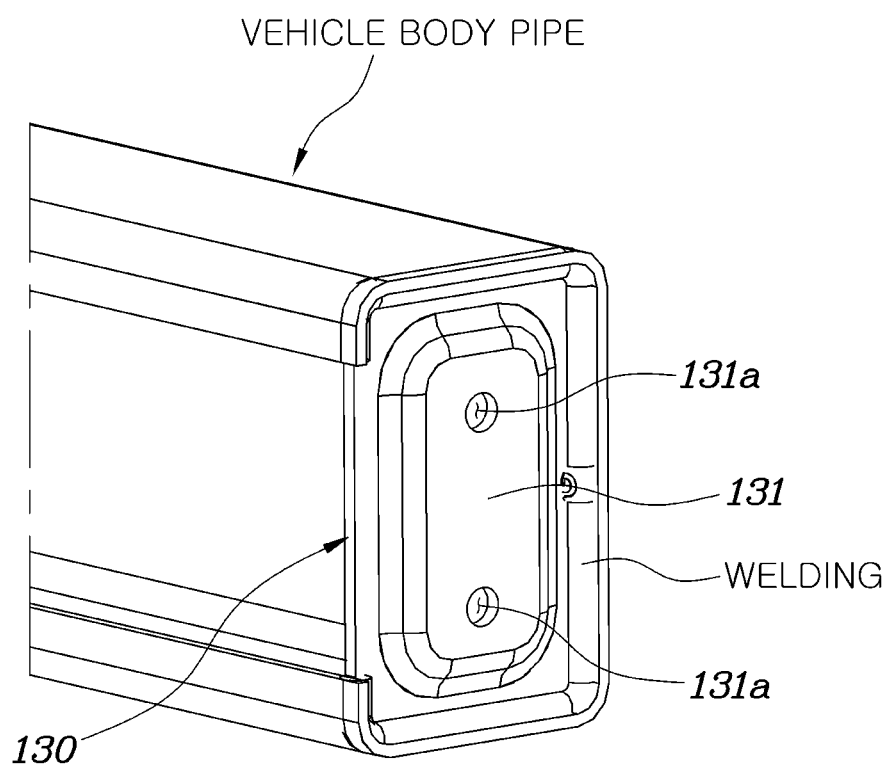
FIG. 6 is a perspective view illustrating that an end patch is coupled to a pipe constituting the end module of the vehicle according to one embodiment of the present disclosure.
Figure 7:
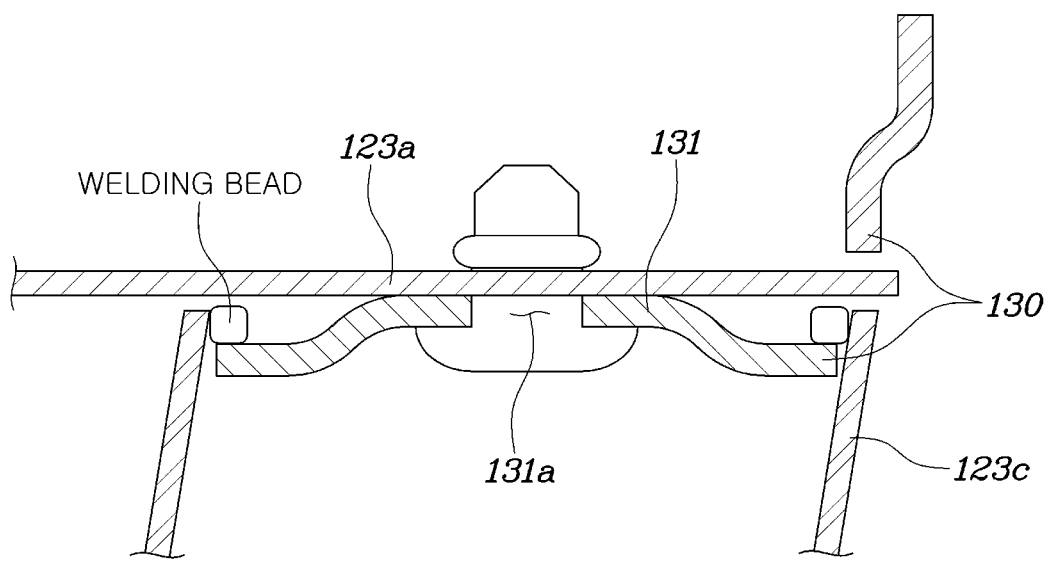
FIG. 7 is a cross-sectional view along line A-A of FIG. 2.
Figure 8:
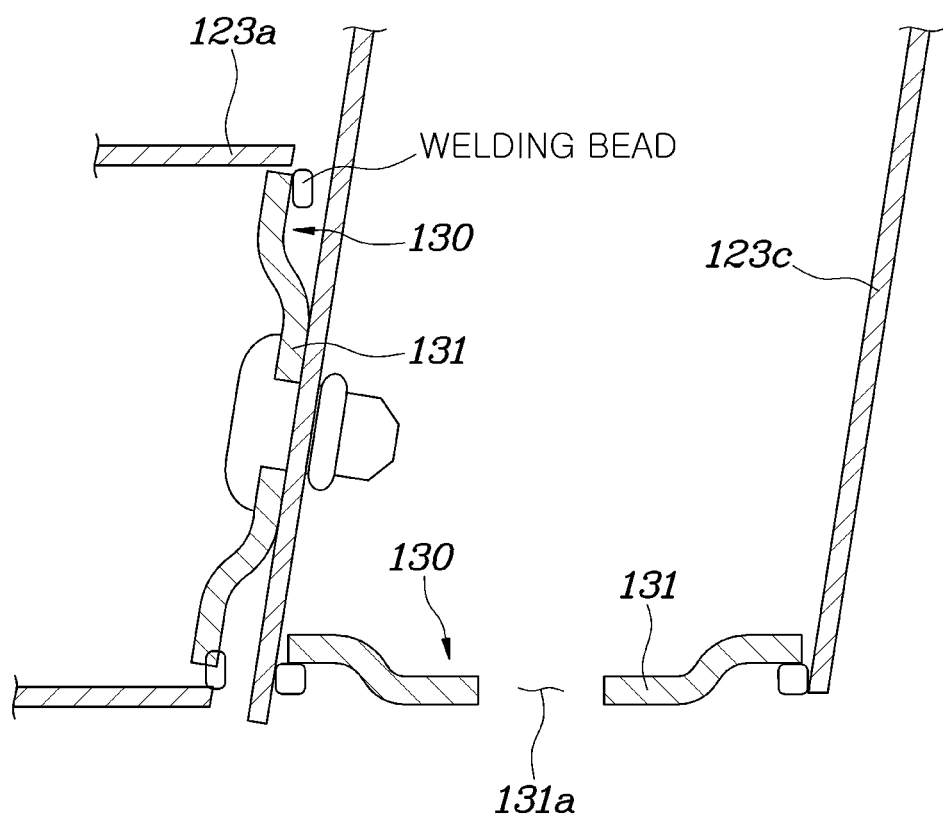
FIG. 8 is a cross-sectional view along line B-B of FIG. 2.
Figure 9:
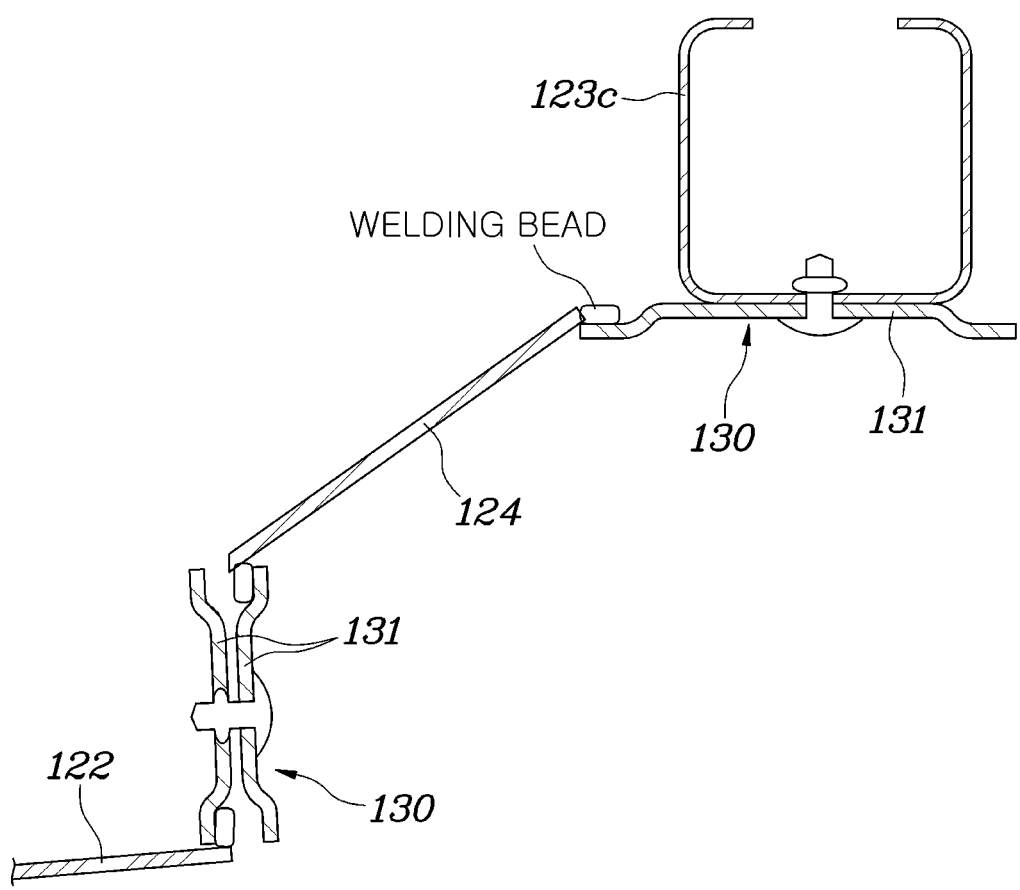
FIG. 9 is a cross-sectional view along line C-C of FIG. 2.

FIG. 6 is a perspective view illustrating that the end patch 130 is coupled to the pipe constituting the end module 120 of the vehicle according to one embodiment of the present disclosure, FIG. 7 is a cross-sectional view along line A-A of FIG. 2, FIG. 8 is a cross-sectional view along line B-B of FIG. 2, and FIG. 9 is a cross-sectional view along line C-C of FIG. 2.

The end patch 130 may be coupled to the end portion of the longitudinal member 121, the transverse member 123*a*, the back beam 122, or the first connection member 123*b*. In addition, although not shown in the drawings, the end patch 130 is also coupled to an end portion of another pipe so that, when the lower bodies of the vehicle are coupled to each other, there is an effect capable of simply fastening the lower bodies to each other by bolting or riveting.

As shown in FIGS. 6 to 9, the end patch 130 may be coupled to the end portion of the pipe forming the support module 123, and it has been shown that the plurality of pipes may be coupled to each other through the end patch 130.

FIG. 7 shows a connection of the transverse member 123*a* and the second connection member 123*c* in the vertical direction, FIG. 8 shows a connection of the transverse member 123*a* and the second connection member 123*c* in a transverse direction, and FIG. 9 shows a coupling of the back beam 122 and the support module 123 by the end patch 130.

Through the structure of the end patch coupled to the end portion of the pipe, there is an effect in that the pipes may be coupled to each other through side coupling, front coupling, or vertical coupling of the pipes in various directions.

In addition, since the end portion of the longitudinal member 121, the transverse member 123*a*, the back beam 122, or the end of the first connection member 123*b* is coupled by welding in a state of being spaced apart inward, and thus a welded bead is located inside the gap space, a finishing operation of the welded bead becomes unnecessary, and there is an effect in that the manufacturing operation may be simplified when compared to the conventional manufacturing process of bending and welding the end portion of the pipe and then finishing the welded bead to complete the manufacturing process.

In addition, since a coupling part 131 formed on the end patch 130 protrudes further than the end portion of the pipe and is coupled to another pipe, there is an effect capable of minimizing a vibration or noise generated in a coupling portion.

A through-hole 131*a* passing through the coupling part 131 is formed in the coupling part 131 so that, when coupled to another pipe, mechanical coupling including bolting or riveting is possible. In this way, the plurality of pipes are easily coupled in the smart factory to complete the vehicle body so that there is an effect of reducing production cost and simplifying the manufacturing process.

The pair of transverse members 123*a* may be formed to be longer than the gap distance between the longitudinal members 121.

Referring to FIGS. 2 to 3, the transverse member 123*a* may be formed to extend to be longer than a distance in which the longitudinal member 121 is spaced apart in the transverse direction.

In this way, through the transverse member 123*a* extending in the transverse direction of the upper side and the lower side of the longitudinal member 121, there is an effect capable of expanding a range covering an impact from the upper portion and the lower portion in the front side of the vehicle.

The support module 123 may further include a second connection member 123c in the form of a pipe extending to connect the end portions of the transverse members 123a spaced apart in the vertical direction.

As shown in FIG. 2, the second connection member 123c extending in the vertical direction may be provided to connect the end portions of the pair of transverse members 123a extending in the transverse direction of the upper side and the lower side of the longitudinal member 121.

In this way, when a front collision occurs, the range in which the support module 123 is capable of absorbing the impact from the front side is extended. In addition, when a diagonal collision or a side collision occurs, there is an effect in that the support module 123 is capable of reinforcing rigidity of the vehicle body.

A reinforcing part 124 may be further included to extend to connect the end portion of the back beam 122 to the second connection member 123c.

The pair of transverse members 123a extending in the transverse direction of the vehicle may extend further than the back beam 122, the second connection member 123c extending in the vertical direction may connect the end portions of the pair of transverse members 123a which are spaced apart in the transverse direction of the vehicle than the back beam 122 and extend in the transverse direction, and a gap space may be formed between the second connection member 123c and the back beam 122.

In order to reinforce the gap space, a reinforcing part 124 connecting the end portion of the back beam 122 to the second connection member 123c may be disposed to connect the support module 123 to the back beam 122.

In this way, there is an effect of improving coupling rigidity between the support module 123 and the back beam 122, and when a front collision occurs, an impact cover range of the back beam 122 may be further expanded through the reinforcing part 124, and even when a diagonal collision occurs, there is an effect in that the reinforcing part 124 is capable of absorbing the impact.

In addition, when a side collision occurs, the second connection member 123c primarily absorbs an impact, the impact is transmitted to a lateral member, and the lateral member forms a load path in which the impact is transmitted to the back beam 122 through the reinforcing part 124 so that, when the side collision occurs, there is an effect capable of distributing an impact amount.

The longitudinal member 121 may be coupled to an inner side of the first connection member 123b.

The longitudinal member 121 extending to the rear side of the back beam 122 is coupled to the inner side of the first connection member 123b, so that, when a side collision occurs, the longitudinal member 121 is formed to allow the second connection member 123c, the first connection member 123b and the transverse member 123a to primarily absorb the impact. When a collision occurs in the front side, the longitudinal member 121 has an effect capable of being protected to absorb the impact.

The end module 120 of the vehicle may be symmetrically disposed in the front side and the rear side of the vehicle.

As shown in FIG. 1, the end module 120 of the vehicle may be provided as a pair of parts having the same shape and symmetrically disposed in the front side and the rear side of the vehicle in the front-rear direction.

In this way, when the end module 120 of the vehicle is manufactured, the same parts may be mass-produced and coupled to the lower body of the vehicle, and thus there is an effect capable of reducing manufacturing production cost.

The longitudinal member 121, the support module 123, and the back beam 122 may be coupled to each other by bolting.

The end module 120 of the vehicle may be formed of the longitudinal member 121 formed of a plurality of pipes, the support module 123, and the back beam 122. The longitudinal member 121, the support module 123, and the back beam 122 may be coupled by bolting or riveting, and through such a coupling method, the end module 120 of the vehicle may be manufactured in the smart factory.

In addition, since the coupling is achieved by bolting or riveting, replacement of parts according to customer needs is easy. In addition, when bending or damage of the pipe occurs due to an accident such as a collision accident, there is an effect of simplifying replacement and repair of the parts.

With reference to FIG. 1, the lower body of the vehicle according to an exemplary embodiment of the present disclosure will be described. In FIG. 1, a reference numeral 230 denotes a lower body side member, and a reference numeral 240 denotes a lower body auxiliary member.

The lower body of the vehicle according to embodiments of the present disclosure includes the end module 120 of the vehicle, and the lower body of the vehicle, in which the upper body is assembled on the upper portion formed of a plurality of pipes, includes a front lower body 100 and a rear lower body 100 in which the end module 120 of the vehicle is coupled to end portions, which are formed of a plurality of pipes, and on which the wheel and the suspension of the vehicle are mounted, a pair of lower body main members 210, each having a pipe shape, configured to connect both sides of upper ends of the front lower body 100 and the rear lower body 100 spaced apart from each other, extend forward and rearward to form side members of upper portions of the front lower body 100 and the rear lower body 100, and form an overall length of the vehicle, and a pair of lower body floor members 220, each having a pipe shape and configured to connect both sides of lower ends of the front lower body 100 and the rear lower body 100 spaced apart from each other.

As shown in FIG. 1, in the lower body of the vehicle, the front lower body 100, the rear lower body 100, the lower body main member 210, and the lower body floor member 220 may be formed of a plurality of pipes and be connected to each other.

In this way, unlike the conventional vehicle body, a pressing process may be omitted during the manufacturing process of the vehicle body so that production cost of the vehicle may be reduced.

The front lower body 100 and the rear lower body 100 are disposed in a front portion and a rear portion of the vehicle and are provided to absorb an impact when a front collision or a rear collision of the vehicle occurs so that it is possible to protect cargo loaded in the upper portion as much as possible.

In addition, a mounting part no on which a suspension is mounted may be provided in each of the front lower body 100 and the rear lower body 100, and a wheel house in which a wheel connected to the suspension is located may be formed.

Upper sides of side surfaces of the front lower body 100 and the rear lower body 100 may be formed such that the member is not connected thereto, the lower body main member 210 may be formed as a pipe extending in the longitudinal direction of the vehicle and is coupled to the upper side of the side surface of the front lower body 100 and to the upper side of the side surface of the rear lower body 100, and thus the lower body main member 210 may extend from the front side to the rear side of the vehicle and may be formed to connect the front lower body 100 to the rear lower body 100 which are spaced apart from each other.

An end module for a vehicle according to embodiments of the present disclosure includes a back beam formed of a plurality of pipes and provided as a pair of back beams in a front-rear direction of a vehicle to extend in a transverse direction of the vehicle, and a longitudinal member configured to extend from an end portion of the back beam and coupled to the vehicle due to a support module coupled to the longitudinal member so that there is an effect capable of absorbing an impact when a front collision or a rear collision of the vehicle occurs, having the same effect as the conventional end module due to the back beam formed of the plurality of pipes and reducing manufacturing production cost and design cost, and simplifying a manufacturing process.

Although the specific embodiments of the present disclosure have been described and illustrated, those skilled in the art will appreciate that various alternations and modifications are possible without departing from the technical spirit of the present disclosure provided in the appended claims.

What is claimed is:

1. An end module of a vehicle comprising:
   a pair of longitudinal members spaced apart in a width direction, each having a pipe shape extending in a front-rear direction of the vehicle, and each being located at end portions of a lower body of the vehicle;
   a support module located in a front end portion or a rear end portion of the lower body, the support module comprising a plurality of pipes comprising a pair of transverse members extending in the width direction and spaced apart in a vertical direction and a first connection member extending in the vertical direction to connect the pair of transverse members, wherein the first connection members is connected to one of the pair of longitudinal members; and
   a back beam comprising a pipe extending in a transverse direction and connected to end portions of the pair of longitudinal members;
   wherein one of the pair of longitudinal members is connected to an inner side of the first connection member.

2. The end module of claim 1, further comprising an end patch coupled to an end portion of one of the pair of longitudinal members, one of the pair of transverse members, the back beam, or the first connection member, each comprising a pipe, wherein the end patch covers a cross section of the one of the pair of longitudinal members, the one of the pair of transverse members, the back beam, or the first connection member and connects the end portion of the one of the pair of longitudinal members, the one of the pair of transverse members, the back beam, or the first connection member to another pipe using a bolt.

3. The end module of claim 2, wherein:
   the end patch is spaced inward from the end portion of the one of the pair of longitudinal members, the one of the pair of transverse members, the back beam, or the first connection member and is coupled thereto by a weld; and
   a bead of the weld is located in a gap space defined by the end patch being spaced inward from the end portion of the one of the pair of longitudinal members, the one of the pair of transverse members, the back beam, or the first connection member.

4. The end module of claim 1, wherein the pair of transverse members is longer than a separation distance between the pair of longitudinal members.

5. The end module of claim 4, wherein the support module further comprises a second connection member comprising a pipe and extending to connect the end portions of the pair of transverse members spaced apart in the vertical direction.

6. The end module of claim 5, further comprising a reinforcing part extending to connect the end portion of the back beam to the second connection member.

7. The end module of claim 1, wherein the end module is symmetrically disposed on a front side and a rear side of the vehicle.

8. The end module of claim 1, wherein one of the pair of longitudinal members, the support module, and the back beam are coupled to each other by a bolt.

9. A lower body of a vehicle comprising:
   a front lower body and a rear lower body each comprising a first plurality of pipes; and
   a pair of lower body main members, each having a pipe shape, configured to connect both sides of upper ends of the front lower body and the rear lower body spaced apart from each other, extend forward and rearward to form side members of upper portions of the front lower body the rear lower body, and form an overall length of the vehicle;
   end modules coupled to end portions of each of the front lower body and the rear lower body, each of the end modules comprising:
      a pair of longitudinal members spaced apart in a width direction, each having the pipe shape extending in a front-rear direction of the vehicle, and each being located at the end portions of each of the front lower body and the rear lower body;
      support modules located in each of the front lower body and the rear lower body, each of the support modules comprising a second plurality of pipes comprising a pair of transverse members extending in the width direction and spaced apart in a vertical direction and a first connection member extending in the vertical direction to connect the pair of transverse members, wherein the first connection member is connected to one of the pair of longitudinal members; and
      a back beam comprising a pipe extending in a transverse direction and connected to the end portions of the pair of longitudinal members;
   wherein one of the pair of longitudinal members is connected to an inner side of the first connection member.

10. The lower body of claim 9, further comprising an end patch coupled to an end portion of one of the pair of longitudinal members, one of the pair of transverse members, the back beam, or the first connection member, each comprising a pipe, wherein the end patch covers a cross section of the one of the pair of longitudinal members, the one of the pair of transverse members, the back beam, or the first connection member and connects the end portion of the one of the pair of longitudinal members, the one of the pair of transverse members, the back beam, or the first connection member to another pipe using a bolt.

11. The lower body of claim 10, wherein:
    the end patch is spaced inward from the end portion of the one of the pair of longitudinal members, the one of the pair of transverse members, the back beam, or the first connection member and is coupled thereto by a weld; and a bead of the weld is located in a gap space defined by the end patch being spaced inward from the end portion of the one of the pair of longitudinal members, the one of the pair of transverse members, the back beam, or the first connection member.

12. The lower body of claim 9, wherein the pair of transverse members is longer than a separation distance between the pair of longitudinal members.

13. The lower body of claim 12, wherein each of the support modules further comprises a second connection member comprising a pipe and extending to connect the end portions of the pair of transverse members spaced apart in the vertical direction.

14. The lower body of claim 13, further comprising a reinforcing part extending to connect the end portion of the back beam to the second connection member.

15. The lower body of claim 9, wherein a first end module of the end modules is symmetrically disposed on a front side of the vehicle and a second end module of the end modules is symmetrically disposed on a rear side of the vehicle.

16. The lower body of claim 9, wherein one of the pair of longitudinal members, one of the support modules, and the back beam are coupled to each other by a bolt.

17. A vehicle comprising:
an upper body comprising a first plurality of pipes; and
a lower body comprising a second plurality of pipes, wherein an upper portion of the lower body is coupled to the upper body, and wherein the lower body comprises a front lower body and a rear lower body;
a pair of lower body main members, each having a pipe shape, configured to connect both sides of upper ends of the front lower body and the rear lower body spaced apart from each other, extend forward and rearward to form side members of upper portions of the front lower body and the rear lower body, and form an overall length of the vehicle; and
a first end module coupled to a front end portion of the front lower body and a second end module coupled to a rear end portion of the rear lower body, each of the first and second end modules comprising:

a pair of longitudinal members spaced apart in a width direction, each having the pipe shape extending in a front-rear direction of the vehicle;
support modules located in each of the front lower body and the rear lower body, each of the support modules comprising a plurality of pipes comprising a pair of transverse members extending in the width direction and spaced apart in a vertical direction and a first connection member extending in the vertical direction to connect the pair of transverse members, and the support module being spaced apart from end portions of the pair of longitudinal members in the front-rear direction of the vehicle and connected to the first connection member and one of the pair of longitudinal members; and
a back beam comprising a pipe extending in a transverse direction and connected to the end portions of the pair of longitudinal members, wherein the vehicle further comprises an end patch coupled to an end portion of one of the pair of longitudinal members, one of the pair of transverse members, the back beam, or the first connection member, each comprising a pipe, wherein the end patch covers a cross section of the one of the pair of longitudinal members, the one of the pair of transverse members, the back beam, or the first connection member and connects the end portion of the one of the pair of longitudinal members, the one of the pair of transverse members, the back beam, or the first connection member to another pipe using a bolt.

18. The vehicle of claim 17, wherein the end patch is spaced inward from the end portion of the one of the pair of longitudinal members, the one of the pair of transverse members, the back beam, or the first connection member.

19. The vehicle of claim 17, wherein the pair of transverse members is longer than a separation distance between the pair of longitudinal members.

20. The vehicle of claim 17, further comprising:
a second connection member of at least one of the support modules; and
a reinforcing part extending to connect the end portion of the back beam to the second connection member.

* * * * *